(12) United States Patent
Lyatkher

(10) Patent No.: US 7,578,126 B2
(45) Date of Patent: Aug. 25, 2009

(54) WAVE POWER INSTALLATION

(76) Inventor: Victor Lyatkher, 563 Bartow La., Richmond Hts., OH (US) 44143

( * ) Notice: Subject to any disclaimer, the term of this patent is extended or adjusted under 35 U.S.C. 154(b) by 0 days.

(21) Appl. No.: 12/284,284

(22) Filed: Sep. 20, 2008

(65) Prior Publication Data

US 2009/0079196 A1    Mar. 26, 2009

(30) Foreign Application Priority Data

Sep. 21, 2007    (RU) .............................. 2007135134

(51) Int. Cl.
*F16D 31/02* (2006.01)
*F03B 13/12* (2006.01)
(52) U.S. Cl. ............................................. 60/398; 29/53
(58) Field of Classification Search ............ 60/398; 290/42, 44, 53, 55
See application file for complete search history.

(56) References Cited

U.S. PATENT DOCUMENTS 4,448,020 A * 5/1984 Wood et al. .................... 60/398
4,630,440 A * 12/1986 Meyerand ..................... 60/398
6,647,717 B2 * 11/2003 Zaslavsky et al. ............. 60/398
7,132,758 B2 * 11/2006 Rochester et al. ............. 60/398
7,150,149 B2 * 12/2006 Rochester et al. ............. 60/398

FOREIGN PATENT DOCUMENTS

SU    47951    7/1936

* cited by examiner

*Primary Examiner*—Michael Leslie
(74) *Attorney, Agent, or Firm*—Aleksandr Smushkovich

(57) ABSTRACT

A wave power installation is presented, comprising a flow chamber, an air-driven turbine disposed in the chamber and coupled with an electro-generator, a float having a cavity accumulating air, communicated with the chamber, a vacuum-creating ejector disposed in water mounted under the float, which ejector is performed as a confuser-diffuser conduit, wherein at least a portion thereof is vertically positioned. The conduit has a minimal through cross-section. At least one reverse valve is mounted in the vicinity of the minimal cross-section. The conduit is communicated with the cavity via the reverse valve. The chamber and turbine can be located on a coast. In embodiments, the conduit is furnished with a cylindrical nozzle, thereby making it stepwise widening downwardly. During both the upward and downward motions of the float, airflow is produced through the chamber, providing for practically continuous generation of electric energy by the installation, and improving its efficiency.

3 Claims, 1 Drawing Sheet

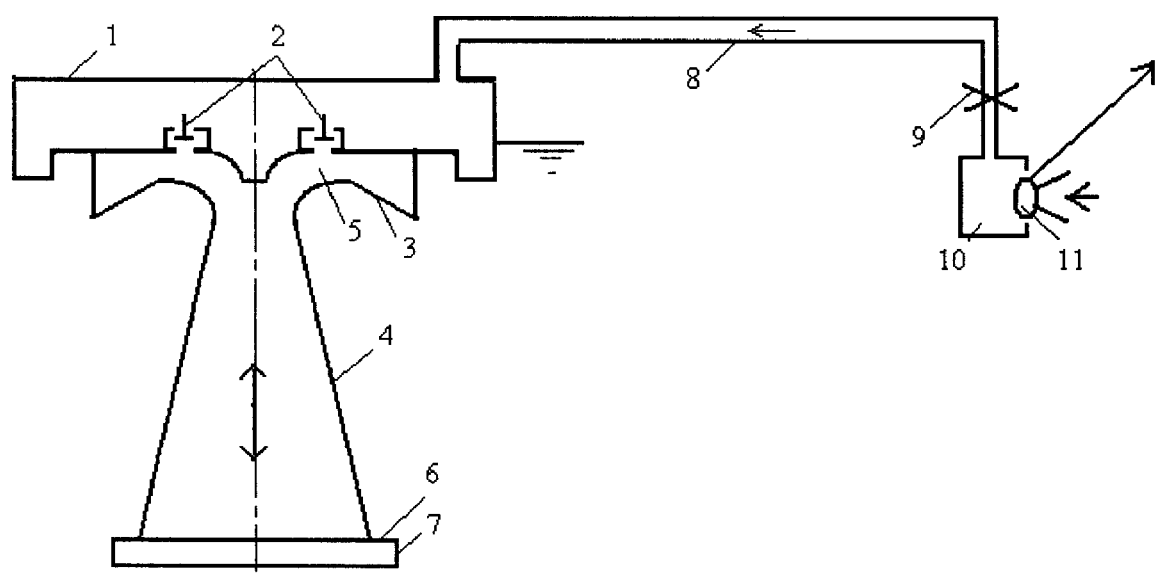
FIGURE

WAVE POWER INSTALLATION

CROSS-REFERENCE TO RELATED APPLICATIONS

This U.S. patent application claims priority under 35 U.S.C. 119 (a) through (d) from a Russian Federation patent application No. 2007135134 filed on 21 Sep. 2007.

BACKGROUND OF THE INVENTION

The invention relates to the field of hydro-power engineering and is intended for production of electric power based on the utilization of renewable energy of surface waves of ocean, sea, lakes, and other similar water reservoirs.

There is known a water-wave power plant comprising an immovable vertical pipe, whose lower half is submerged into water, a movable pipe enclosing the immovable pipe and supplied with a float, a turbine situated below the water level coupled to an electro-generator and rigidly attached to the movable pipe (U.S. Pat. No. 4,914,915, issued 10 Apr. 1990). Such power station has many movable elements that reduces reliability of its operation and requires significant capital expenses for its construction.

The closest prior art to the instant invention in terms of its structure and achievable result is a wave power installation comprising an ejector unit capable of creating vacuum, and an air-driven turbine mounted in a flow chamber, connected to an electro-generator (USSR Inventor Certificate SU No 47951 issued 31 Jul. 1936). The ejector unit is performed in the form of a suction diffusion grating that allows creating airflow through the air-driven turbine. However, the absence of a contraction and expansion conduit of a suitable profile, which would allow creating vacuum independent on the direction of its movement, reduces the efficiency of vacuum creation, and leads to decreasing productivity of the suction grating and the entire wave power installation.

BRIEF SUMMARY OF THE INVENTION

The present invention is dedicated to solving a problem of creation of a structurally simple wave power installation with a possibly minimal number of movable elements. The invention enables achieving a simple and efficient design of water wave power installations, increasing their power and reliability by means of creating vacuum independently on the movement direction of ejector units incorporated therein.

The specified problem is solved, and the technical result is attained due to a special design of the wave power installation that comprises a flow chamber; an air turbine disposed in the flow chamber and coupled with an electrical generator; a float having a cavity for accruing air, the cavity is communicated via a pipeline with the exit of the flow chamber; a vacuum-creating ejector unit disposed in water and fixedly mounted under the float, wherein the ejector is performed as a confuser-diffuser conduit with a convergent-divergent shape, at least a portion of the conduit is substantially vertically positioned, which conduit has a minimal through cross-section, in the vicinity of the minimal cross-section at least one reverse valve is mounted, and the conduit is communicated with the cavity via the at least one reverse valve.

The flow chamber with the air-driven turbine and the electro-generator of wave power installation can be optionally located on a coast area.

In some embodiments, the confuser-diffuser conduit in the region of its lower inlet section can be supplied with a cylindrical nozzle, making the conduit stepwise widening downwardly.

During research, it has been established that vacuum can be created in the cavity of the float independent on the direction of reciprocal-progressive movement of the confuser-diffuser conduit. It has been achieved because the ejector unit is disposed in water under the float having the cavity accumulating air, and is performed as a confuser-diffuser conduit, which conduit in its minimal cross-section is communicated via at least one reverse valve with the cavity. As a result, a predetermined extent of vacuum (air rarefaction) is created during the upward motion of the conduit, fixed to the float, following water waves, as well as during the downward motion thereof. Thus, the rarefaction in the cavity practically continuously takes place that allows increasing the output efficiency and power of the wave power installation.

As noted above, in some embodiments, the confuser-diffuser conduit can be furnished with a cylindrical nozzle, thereby made stepwise widening downwardly that allows increasing pressure of the input liquid flow, incoming into the conduit during its downward motion, and decreasing the output liquid flow coming out of the conduit during its upward motion, following the waves.

BRIEF DESCRIPTION OF THE DRAWING

Attached hereto FIGURE shows a schematic view of the wave power installation according to a preferred embodiment of the present invention. Each reference number indicated on FIGURE is designated to an element of the inventive structure described herein below. A first time introduced reference number in the description is enclosed into parentheses.

DETAIL DESCRIPTION OF A PREFERRED EMBODIMENT OF THE INVENTION

While the invention may be susceptible to embodiment in different forms, there is shown in the drawing, and will be described in detail herein, a specific embodiment of the present invention, with the understanding that the present disclosure is to be considered an exemplification of the principles of the invention, and is not intended to limit the invention to that as illustrated and described herein.

As illustrated on FIGURE, the wave power installation comprises a float (1) with a cavity made herein capable of accumulating air and at least one reverse valve (2). The installation comprises an ejector unit fixed to the float 1 on its underside, and disposed in water. The ejector unit is performed as a confuser-diffuser conduit consisting of two channels: an upper channel (3) and a lower channel (4), communicated with each other in the vicinity of their least flow cross-section (5). The upper channel 3 is located under the bottom of float 1 and is narrowed in a direction from the periphery of float 1 to its center, whereas the lower channel 4 is located substantially vertically and is narrowed upwards. In the region of the cross-section 5, the so formed confuser-diffuser conduit is communicated via the at least one reverse valve 2 with the cavity of float 1. In the region of its bottom opening, the channel 4 is furnished with a cylindrical nozzle (7), so that a ledge (6) is circumferentially formed around the bottom opening of the channel 4, making the conduit stepwise widening downwardly.

The cavity of float 1 is communicated by means of a pipeline (8) through a valve (9) with the output of a flow chamber (10). An air-driven turbine (11) is coupled with an electro-generator (not illustrated). The turbine 11 is disposed within the chamber 10.

The flow chamber 10 with the air turbine 11 and the electro-generator can be mounted on a coast site, as shown on FIGURE. Alternatively, the chamber 10 may be mounted on a pontoon located in proximity to the float 1, or immediately on the float (not illustrated).

Operation of the Preferred Embodiment

The wave power installation operates as follows:

When the float 1 together with a wave moves up the conduit, fixed to the float, moves upwards as well. This causes the liquid contained therein to move downwards. Thus, the liquid surrounding the conduit enters the conduit via the upper channel 3 and accelerates due to the narrowing of channel 3 in the course of its motion. As a result, static pressure drops in the vicinity of the least flow section 5 due to the increased velocity of the liquid therein. This causes the opening of the at least one reverse valve 2 and the suction of air out from the cavity of float 1, creating rarefaction in the cavity that communicates with the chamber 10.

Because of the rarefaction, the surrounding air under the atmospheric pressure flows via the chamber 10 through the pipeline 8 into the cavity of float 1 to level off its pressure with the surrounding pressure.

While flowing through the chamber 10, the airflow rotates the air-driven turbine 11 that, in turn, revolves the rotor of the electro-generator, which causes generation of electric energy therein.

During the downward movement of the float 1 caused by the waves, the conduit moves downward as well. This causes the liquid contained therein to move upwards. The further operation of the power installation is analogous to the above described, but with the opposite direction of liquid flow in the conduit.

Thus, practically continuously, during both the upward and downward motion of the float 1 with the conduit, airflow through the chamber 10 is produced, which creates conditions for continuous generation of electric energy by the power installation, and improves it efficiency.

The present invention can be used for arrangement of non-polluting power farms or plants, particularly in coastal areas, and, for example, can be utilized in proximity to platforms employed for underwater extraction of minerals.

I claim:

1. A wave power installation comprising:
   a flow chamber;
   an air-driven turbine disposed in the flow chamber and coupled with an electrical generator;
   a float having a cavity for accumulating air, said cavity is communicated with said flow chamber;
   a vacuum-creating ejector disposed in water and fixedly mounted under said float, said ejector is performed as a confuser-diffuser conduit in a convergent-divergent shape, wherein at least a portion of said conduit is substantially vertically positioned, said conduit has a minimal through cross-section; and
   at least one reverse valve mounted in the vicinity of said minimal cross-section; wherein
   said conduit is communicated with said cavity via said at least one reverse valve.

2. The wave power installation according to claim 1, wherein said flow chamber and said air-driven turbine are located on a coast area.

3. The wave power installation according to claim 1, wherein said conduit is furnished with a cylindrical nozzle, thereby making the conduit stepwise widening downwardly.

* * * * *